(12) United States Patent
Zhang

(10) Patent No.: US 10,970,344 B2
(45) Date of Patent: Apr. 6, 2021

(54) SYSTEMS AND METHODS FOR RECOMMENDING PERSONALIZED CONTENT

(71) Applicant: BEIJING DIDI INFINITY TECHNOLOGY AND DEVELOPMENT CO., LTD., Beijing (CN)

(72) Inventor: Lingyu Zhang, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 321 days.

(21) Appl. No.: 15/834,231

(22) Filed: Dec. 7, 2017

(65) Prior Publication Data

US 2018/0137204 A1 May 17, 2018

Related U.S. Application Data

(63) Continuation of application No. PCT/CN2017/074733, filed on Feb. 24, 2017.

(30) Foreign Application Priority Data

May 10, 2016 (CN) .......................... 201610309337.X
May 25, 2016 (CN) .......................... 201610356404.3

(51) Int. Cl.
*G06F 17/00* (2019.01)
*G06F 16/9535* (2019.01)
(Continued)

(52) U.S. Cl.
CPC .......... *G06F 16/9535* (2019.01); *G06F 16/29* (2019.01); *G06F 16/9038* (2019.01);
(Continued)

(58) Field of Classification Search
CPC ............. G06F 16/9535; G06F 16/9537; G06F 16/9038; G06F 16/29; G06F 16/909;
(Continued)

(56) References Cited

U.S. PATENT DOCUMENTS 8,799,302 B2 8/2014 Singerman et al.
2006/0266830 A1* 11/2006 Horozov ................ G07C 13/00
235/386
(Continued)

FOREIGN PATENT DOCUMENTS

CN 102031672 A 6/2011
CN 102802116 A 11/2012
(Continued)

OTHER PUBLICATIONS

Examination Report in Japanese Application No. 2017-564131 dated May 28, 2019, 17 pages.
(Continued)

*Primary Examiner* — Hasanul Mobin
(74) *Attorney, Agent, or Firm* — METIS IP LLC

(57) ABSTRACT

The present disclosure relates to a method and system for providing location based service to end users. The method includes acquiring one or more historical orders associated with a user within a predetermined time interval; retrieving a first set of points of interests (POI) associated with the user based on the one or more historical orders; storing the first set of POIs associated with the user in a first database; retrieving a second set of POIs from a second database; updating the first set of POIs in the first database based on the second set of POIs and the one or more historical orders; receiving location information of the user from a user equipment; determining one or more personalized content items based on the updated first set of POIs and the location information of the user; and transmitting the one or more
(Continued)

personalized content items to be displayed on the user equipment.

20 Claims, 12 Drawing Sheets

(51) Int. Cl.

| | | |
|---|---|---|
| *G06F 16/29* | (2019.01) | |
| *G06F 16/9038* | (2019.01) | |
| *G06Q 30/00* | (2012.01) | |
| *G06F 16/9537* | (2019.01) | |
| *G06Q 30/02* | (2012.01) | |
| *H04W 4/021* | (2018.01) | |

(52) U.S. Cl.
CPC ......... *G06F 16/9537* (2019.01); *G06Q 30/00* (2013.01); *G06Q 30/0255* (2013.01); *G06Q 30/0259* (2013.01); *G06Q 30/0261* (2013.01); *H04W 4/021* (2013.01)

(58) Field of Classification Search
CPC ........... G06Q 30/0261; G06Q 30/0259; G06Q 30/0255; G06Q 30/00; H04W 4/021
See application file for complete search history.

(56) References Cited

U.S. PATENT DOCUMENTS

| | | | |
|---|---|---|---|
| 2006/0287810 A1 | 12/2006 | Sadri et al. | |
| 2010/0076968 A1* | 3/2010 | Boyns .................... | H04W 4/21 707/732 |
| 2011/0093458 A1 | 4/2011 | Zheng et al. | |
| 2011/0219226 A1 | 9/2011 | Olsson et al. | |
| 2012/0054035 A1* | 3/2012 | Nam .................... | G06Q 10/047 705/14.58 |
| 2012/0150871 A1* | 6/2012 | Hua .................... | G06F 16/9537 707/748 |
| 2012/0197714 A1* | 8/2012 | Beyeler ................ | G01C 21/367 705/14.49 |
| 2013/0006515 A1* | 1/2013 | Vellaikal ............ | G01C 21/3679 701/410 |
| 2013/0054359 A1 | 2/2013 | Ross et al. | |
| 2013/0103697 A1* | 4/2013 | Hill .................... | G06F 16/9537 707/748 |
| 2013/0262479 A1* | 10/2013 | Liang .................... | H04W 4/021 707/748 |
| 2014/0095063 A1* | 4/2014 | Saraswat ............ | G06Q 30/0631 701/410 |
| 2014/0149213 A1 | 5/2014 | Fallatah | |
| 2014/0235208 A1 | 8/2014 | Farmer et al. | |
| 2015/0134235 A1* | 5/2015 | Shan ....................... | G06F 16/29 701/409 |
| 2015/0169573 A1* | 6/2015 | Arora .................... | G06F 16/951 707/724 |
| 2015/0169605 A1* | 6/2015 | Kogan .............. | G06F 16/90324 707/737 |
| 2016/0018233 A1 | 1/2016 | Xu et al. | |
| 2016/0203198 A1* | 7/2016 | Roytblat ............... | G06F 16/444 707/756 |
| 2017/0048664 A1* | 2/2017 | Zhang ................. | G06F 16/9535 |
| 2018/0268041 A1 | 9/2018 | Roytblat et al. | |

FOREIGN PATENT DOCUMENTS

| | | |
|---|---|---|
| CN | 103853740 A | 6/2014 |
| CN | 103902742 A | 7/2014 |
| CN | 103970743 A | 8/2014 |
| CN | 104090980 A | 10/2014 |
| CN | 104657351 A | 5/2015 |
| CN | 104850641 A | 8/2015 |
| CN | 105354106 A | 2/2016 |
| CN | 105512262 A | 4/2016 |
| JP | 2006162270 A | 6/2006 |
| JP | 2007219754 A | 8/2007 |
| JP | 2010271230 A | 12/2010 |
| TW | M358365 U | 6/2009 |
| WO | 2014185011 A1 | 11/2014 |
| WO | 2015021532 A1 | 2/2015 |

OTHER PUBLICATIONS

International Search Report in PCT/CN2017/074733 dated May 10, 2017, 4 pages.
Written Opinion in PCT/CN2017/074733 dated May 10, 2017, 4 pages.
Examination Report in Australian Application No. 2017264072 dated Oct. 26, 2018, 6 pages.
European Search report in European Application No. 17795286.8 dated Jul. 30, 2018, 9 pages.
First Office Action in Chinese Application No. 201610356404.3 dated Mar. 3, 2020, 13 pages.
First Office Action in Chinese Application No. 201610309337.X dated Apr. 23, 2020, 15 pages.
Second Office Action in Chinese Appncation No. 201610356404.3 dated Aug. 20, 2020, 14 pages
Summons to attend oral proceedings pursuant to Rule 115(1) EPC in European Application No. 17795286.6 dated Sep. 21, 2020, 11 pages.

\* cited by examiner

SYSTEMS AND METHODS FOR RECOMMENDING PERSONALIZED CONTENT

CROSS-REFERENCE TO RELATED APPLICATIONS

This application is a continuation of International Application No. PCT/CN2017/074733 filed on Feb. 24, 2017, which claims priority of Chinese Patent Application No. 201610309337.X filed on May 10, 2016, Chinese Patent Application No. 201610356404.3 filed on May 25, 2016, the entire contents of each of which are hereby incorporated by reference.

TECHNICAL FIELD

This application relates generally to systems and methods of providing the location based services to end users. Specifically, the present disclosure relates to systems and methods of updating database of point of interest (POI) and recommending personalized content to end users based on the updated database of POI.

BACKGROUND

As the era of big data and mobile internet approaches, a service provider is able to recommend personalized content to a user to be presented on a user equipment (UE) based on the location of the user. The personalized content is generated further based on historical data associated with the user and/or the UE. Existing location based services use information of point of interest (POI) as location reference. But inconsistency in the information of POIs may lead to a mismatching between the recommended content items and the user's preference or intention. Also, the redundancy in the information of POIs may cause the content search and recommendation less efficient. Thus it would be desirable to improve the consistency in the information of POIs and reduce the redundancy within the information of POIs, to achieve more efficient and accurate content recommendation.

SUMMARY

In a first aspect of the present disclosure, a system is provided. The system includes at least one processor and a computer-readable storage medium storing a first set of instructions for monitoring a target vehicle. When executing the first set of instructions, the at least one processor is detected to: acquire one or more historical orders associated with a user within a predetermined time interval; retrieve a first set of points of interests (POI) associated with the user based on the one or more historical orders; store the first set of POIs associated with the user in a first database; retrieving a second set of POIs from a second database; update the first set of POIs in the first database based on the second set of POIs and the one or more historical orders; receive location information of the user from a user equipment; determine one or more personalized content items based on the updated first set of POIs and the location information of the user; and transmit the one or more personalized content items to be displayed on the user equipment.

In the system provided above, the one or more historical orders may be associated with a location based service provided to the user, wherein the second database stores real-time data associated with the location based service provided to a plurality of users.

Further, in the system provided above, each POI of the first set of POIs and the second set of POIs includes longitude and latitude information associated with each POI.

Further, in the system provided above, to update the first set of POIs in the first database based on the second set of POIs and the one or more historical orders, the at least one processor is further directed to: compute a number of occurrence of each of the first set of POIs in the one or more historical orders; identify a third set of POIs that each occurs in the one or more historical orders with a corresponding POI occurring in the second database; and compute a geographical distance between each of the third set of POIs occurring in the first database and the corresponding POI occurring in the second database.

Further, in the system provided above, to update the first set of POIs in the first database based on the second set of POIs and the one or more historical orders, the at least one processor is further directed to: update the one of the third set of POIs occurring in the first database with the corresponding POI occurring in the second database, when the geographic distance between one of the third set of POIs occurring in the first database and the corresponding POI occurring in the second database is less than a first threshold and the number of occurrence of the one of the third set of POIs occurring in the one or more historical orders is greater than a second threshold.

Further, in the system provided above, to update the first set of POIs in the first database based on the second set of POIs and the one or more historical orders, the at least one processor is further directed to: delete the one of the third set of POIs from the first database, when the geographic distance between one of the third set of POIs occurring in the first database and the corresponding POI occurring in the second database is less than the first threshold and the number of occurrence of the one of the third set of POIs occurring in the one or more historical orders is less than the second threshold.

Further, in the system provided above, to update the first set of POIs in the first database based on the second set of POIs and the one or more historical orders, the at least one processor is further directed to: delete the one of the first set of POIs from the first database, if it is determined that no POI occurs in both the one or more historical orders and the second database, and when the number of occurrence of one of the first set of POIs in the one or more historical orders is less than the second threshold.

Further, in the system provided above, the at least one processor is further directed to perform redundancy reduction on the first set of POIs.

Further, in the system provided above, performing redundancy reduction on the first set of POIs further comprises: retrieving a first POI and a second POI from the first set of POIs; computing a first distance between the first POI and the second POI; computing a second distance between the first POI and the second POI; determining whether the first POI and the second POI indicate an identical geographical entity based on the first distance and the second distance; and when it is determined that first POI and the second POI indicate the identical geographical entity, merging the first POI and the second POI in the first database.

Further, in the system provided above, performing redundancy reduction on the first set of POIs further comprises normalizing the second distance such that the value of the second distance is between 0 and 1.

Further, in the system provided above, to determine whether the first POI and the second POI indicate an identical geographical entity based on the first distance and the second distance, the at least one processor is further directed to: determine that the first POI and the second POI indicate the identical geographical entity, when the first distance is less than and equal to a third threshold and the normalized second distance is less than and equal to a fourth threshold.

In a second aspect of the present disclosure, a method is provided. The method is related to the method of updating a set of POIs in a database and recommending personalized contents to a user/user equipment. The method includes acquiring one or more historical orders associated with a user within a predetermined time interval; retrieving a first set of points of interests (POI) associated with the user based on the one or more historical orders; storing the first set of POIs associated with the user in a first database; retrieving a second set of POIs from a second database; updating the first set of POIs in the first database based on the second set of POIs and the one or more historical orders; receiving location information of the user from a user equipment; determining one or more personalized content items based on the updated first set of POIs and the location information of the user; and transmitting the one or more personalized content items to be displayed on the user equipment.

In the method provided above, the one or more historical orders may be associated with a location based service provided to the user, wherein the second database stores real-time data associated with the location based service provided to a plurality of users.

Further, in the method provided above, each POI of the first set of POIs and the second set of POIs includes longitude and latitude information associated with each POI.

Further, in the method provided above, to update the first set of POIs in the first database based on the second set of POIs and the one or more historical orders, the at least one processor is further directed to: compute a number of occurrence of each of the first set of POIs in the one or more historical orders; identify a third set of POIs that each occurs in the one or more historical orders with a corresponding POI occurring in the second database; and compute a geographical distance between each of the third set of POIs occurring in the first database and the corresponding POI occurring in the second database.

Further, in the method provided above, to update the first set of POIs in the first database based on the second set of POIs and the one or more historical orders, the at least one processor is further directed to: update the one of the third set of POIs occurring in the first database with the corresponding POI occurring in the second database, when the geographic distance between one of the third set of POIs occurring in the first database and the corresponding POI occurring in the second database is less than a first threshold and the number of occurrence of the one of the third set of POIs occurring in the one or more historical orders is greater than a second threshold.

Further, in the method provided above, to update the first set of POIs in the first database based on the second set of POIs and the one or more historical orders, the at least one processor is further directed to: delete the one of the third set of POIs from the first database, when the geographic distance between one of the third set of POIs occurring in the first database and the corresponding POI occurring in the second database is less than the first threshold and the number of occurrence of the one of the third set of POIs occurring in the one or more historical orders is less than the second threshold.

Further, in the method provided above, to update the first set of POIs in the first database based on the second set of POIs and the one or more historical orders, the at least one processor is further directed to: delete the one of the first set of POIs from the first database, if it is determined that no POI occurs in both the one or more historical orders and the second database, and when the number of occurrence of one of the first set of POIs in the one or more historical orders is less than the second threshold.

Further, in the method provided above, the at least one processor is further directed to perform redundancy reduction on the first set of POIs.

Further, in the method provided above, performing redundancy reduction on the first set of POIs further comprises: retrieving a first POI and a second POI from the first set of POIs; computing a first distance between the first POI and the second POI; computing a second distance between the first POI and the second POI; determining whether the first POI and the second POI indicate an identical geographical entity based on the first distance and the second distance; and when it is determined that first POI and the second POI indicate the identical geographical entity, merging the first POI and the second POI in the first database.

Further, in the method provided above, performing redundancy reduction on the first set of POIs further comprises normalizing the second distance such that the value of the second distance is between 0 and 1.

Further, in the method provided above, to determine whether the first POI and the second POI indicate an identical geographical entity based on the first distance and the second distance, the at least one processor is further directed to: determine that the first POI and the second POI indicate the identical geographical entity, when the first distance is less than and equal to a third threshold and the normalized second distance is less than and equal to a fourth threshold.

In a third aspect of the present disclosure, a non-transitory machine-readable medium is provided. The non-transitory machine-readable medium is related to updating a set of POIs in a database and recommending personalized contents to a user/user equipment. The non-transitory machine-readable medium includes information recorded thereon for recommending personalized content to a user, wherein the information, when read by the machine, causes the machine to perform the following: acquiring one or more historical orders associated with a user within a predetermined time interval; retrieving a first set of points of interests (POI) associated with the user based on the one or more historical orders; storing the first set of POIs associated with the user in a first database; retrieving a second set of POIs from a second database; updating the first set of POIs in the first database based on the second set of POIs and the one or more historical orders; receiving location information of the user from a user equipment; determining one or more personalized content items based on the updated first set of POIs and the location information of the user; and transmitting the one or more personalized content items to be displayed on the user equipment.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
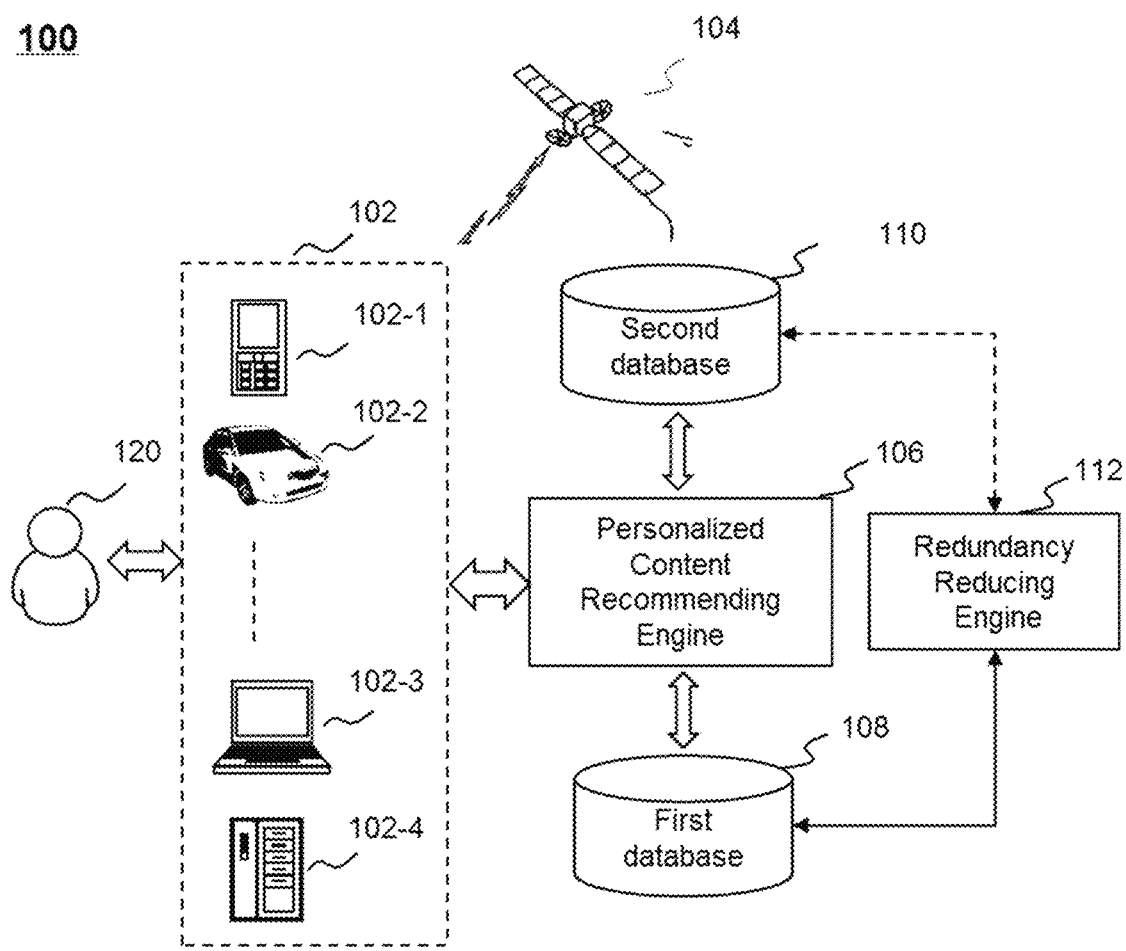
FIG. 1 is a block diagram of an exemplary location based service-providing system according to some embodiments of the present disclosure.

In the following detailed description, numerous specific details are set forth by way of examples in order to provide a thorough understanding of the relevant teachings. However, it should be apparent to those skilled in the art that the present disclosure may be practiced without such details. In other instances, well known methods, procedures, systems, components, and/or circuitry have been described at a relatively high level, without detail, in order to avoid unnecessarily obscuring aspects of the present disclosure.

The present disclosure describes methods and systems for providing a location based service (LBS) to end users. Specifically, the present disclosure relates to systems and methods of updating database of point of interest (POI) and recommending personalized contents to end users based on the updated database. While providing location based services to end users, a location based service-providing system may recommend personalized contents to the target user. The recommendation may be based on historical data and/or information on points of interests specific to the end users. The present disclosure relates to systems and methods that can be used to reduce the inconsistency in the information of point of interest, so that the matching between the recommended contents and the preference and/or intension of target users may be streamlined. Using the systems and methods disclosed in the present disclosure, the data of POIs may be allocated between various databases of POIs to balance the need of portability and contemporariness.

The present disclosure updates the database for personalized content recommendation using the real-time POI inputs so that the POI data stored in the database is up-to-date. As such, the present disclosure can recommend content to a user that more accurately meets the user's personal needs. Further, the present disclosure reduces the storage redundancy of the POI data in a database by analyzing the semantic meanings of the POI names and the geographic locations of the POIs. Therefore, the storage capacity of the database be utilized more efficiently. In addition, as multiple POIs are merged into one entry in the database, searching efficiency can be improved.

The systems and methods for providing location based services to end users may be used in different LBS systems (location includes but is not limited to land location, sea location and air location, or the like, or a combination thereof) including vehicle navigation system employed for taxi and/or limousine, intra-city express delivery system, or the like, or a combination thereof. It is understood that these exemplary applications of the system and method disclosed herein are provided for illustration purposes, and not intended to limit the scope of the present disclosure. The disclosed system and method may be applied in other contexts, e.g., other service providing systems.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

In the present disclosure, a "user," an "end user," a "requester," a "service requester," and a "customer" are used interchangeably to refer to individuals that are requesting or ordering a service. Also, a "provider," a "service provider," and a "supplier" are used interchangeably to refer to an individual, an entity or a tool that may provide a service or facilitate the providing of the service. The term "party" may refer to an individual that is requesting or ordering a service, or an individual, an entity that may provide a service. The term "user equipment" in the present disclosure may refer to a tool that may be used to request a service, order a service, facilitate the requesting of the service, provide a service, or facilitate the providing of the service.

The term "order" and "service request" in the present disclosure are used interchangeably to refer to a request that may be initiated by a passenger, a requester, a service requester, a customer, a driver, a provider, a service provider, a supplier, or the like, or any combination thereof. The order may be accepted by any one of a passenger, a requester, a service requester, a customer, a driver, a provider, a service provider, or a supplier. The order may be chargeable or free.

An aspect of the present disclosure relates to systems and methods for updating database of point of interest (POI) and recommending personalized contents to end users based on the updated database of POI. A service-providing system may update information of POI in a back-end database based on a comparison of the historical POI data and the real-time POI data. The historical POI data and the real-time POI data may be stored in different databases. The service-providing system may then determine personalized content items to a user based on the updated POI data and the location of the user.

FIG. 1 is a block diagram of an exemplary location based service-providing system 100 according to some embodiments of the present disclosure. For example, the location based service-providing system 100 may be an online transportation service (OTS) platform. The OTS platform may provide transportation services such as taxi hailing, chauffeur service, express car, carpool, bus service, driver hire and shuttle service. The location based service-providing system 100 may include a user equipment (UE) 102, a positioning system 104, a personalized content recommending (PCR) engine 106, a first database 108, a second database 110, and a redundancy reducing engine 112. The personalized content recommending engine 106 may interact with a user 120 equipped with the UE 102.

The PCR engine 106 may process information and/or data related to the service request from the user 120 to perform one or more functions described in the present disclosure. As another example, the PCR engine 106 may periodically update the point of interest (POI) information stored in the first database 108 with the real-time POI information stored in the second database 110. In some embodiments, the PCR engine 106 may include one or more processors (e.g., single-core processing engine(s) or multi-core processor(s)). Merely by way of example, the PCR engine 106 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The PCR engine 106 may interact with the user 120. In some embodiments, the PCR engine 106 may process a plurality of transactions with the user 120. For example, the PCR engine 106 may retrieve historical order(s) associated with the user 120 from the first database 108. The historical order(s) may contain one or more orders of goods and/or services placed by the user 120 at a plurality of points of interests and/or in the proximity of the plurality of points of interests. The PCR engine 106 may retrieve the historical order(s) within a predetermined time interval. As another example, the PCR engine 106 may selectively retrieve the historical order(s) associated with a specific category of the good and/or services.

The PCR engine 106 may interact with the user 120 via a user equipment 102. In some embodiments, the user equipment 102 may include a mobile device 102-1, a built-in device in a transportation system 102-2, a laptop computer 102-3, a mainframe computer 102-4, or the like, or any combination thereof. In some embodiments, the mobile device 102-1 may include a wearable device, a smart mobile device, a virtual reality device, an augmented reality device, or the like, or any combination thereof. In some embodiments, the wearable device may include a smart bracelet, a smart footgear, a smart glass, a smart helmet, a smart watch, smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, the built-in device in the transportation system 102-2 may include an onboard computer (car-puter), an onboard television, etc. The transportation system may refer to a vehicle or a device that is able to transport human or objects between different locations. For example, the vehicle(s) of the transportation systems may include a horse, a carriage, a rickshaw (e.g., a wheelbarrow, a bike, a tricycle, etc.), a car (e.g., a taxi, a bus, a train, a subway, a private car, etc.), a train, a subway, a vessel, an aircraft (e.g., an airplane, a helicopter, a space shuttle, a rocket, a hot-air balloon, etc.), or the like, or any combination thereof.

In some embodiments, the user equipment 102 may be configured with positioning functionality for locating the position of the user and/or the user equipment 102. The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure. In some embodiments, the positioning functionality of the UE 102 may be provided via a positioning system 104. For example, the positioning system 104 may be a satellite, an unmanned aircraft system, a helicopter, or the like, or any combination thereof. The communication between the positioning system 104 and the user/user equipment 102 may be established via a network (not shown). Similarly, the communication between the location based service-providing system 100 and the user/user equipment may be established via a similar or different network (not shown).

The network may facilitate exchange of information and/or data. In some embodiments, one or more components in the location based service-providing system 100 (e.g., the PCR engine 106, the user equipment 102, and the first database 108 and/or the second database 110) may send information and/or data to other component(s) in the location based service-providing system 100 via the network. For example, the PCR engine 106 may obtain/acquire service request from the user equipment 102 via the network. In some embodiments, the network may be any type of wired or wireless network, or combination thereof. Merely by way of example, the network 102 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network may include one or more network access points. For example, the network may include wired or wireless network access points such as base stations and/or internet exchange points through which one or more components of the location based service-providing system 100 may be connected to the network to exchange data and/or information.

The first database 108 and/or the second database 110 may store data and/or instructions. In some embodiments, the first database 108 and/or the second database 110 may store data obtained from the user equipment 102. In some embodiments, the first database 108 and/or the second database 110 may store data and/or instructions that the PCR engine 106 may execute or use to perform exemplary methods described in the present disclosure. According to the illustrated embodiment, the first database 108 may be a back-end database that stores historical data and the second database 110 may be a front-end database that stores real-time data. In some embodiments, the first database 108 and/or the second database 110 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the first database 108 and/or the second database 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the first database 108 and/or the second database 110 may be connected to the network to communicate with one or more components in the location based service-providing system 100 (e.g., the PCR engine 106, the user equipment 102, etc.). One or more components in the location based service-providing system 100 may access the data or instructions stored in the first database 108 and/or the second database 110 via the network. In some embodiments, the first database 108 and/or the second database 110 may be directly connected to or communicate with one or more components in the location based service-providing system 100 (e.g., the PCR engine 106, the user equipment 102, etc.). In some embodiments, the first database 108 and/or the second database 110 may be part of the PCR engine 106.

The redundancy reducing engine 112 may process information and/or data related to the first database 108 and/or the second database 110 to perform one or more functions described in the present disclosure. As an example, the redundancy reducing engine 112 may traverse the point of interest (POI) information stored in the first database 108 to check the redundancy status of the POIs stored in the first database 108. As another example, the redundancy reducing engine 112 may schedule the redundancy reducing operations periodically to clean up the redundant POI entries in the first database 108 and/or the second database 110. In some embodiments, the redundancy reducing engine 112 may include one or more processors (e.g., single-core processing engine(s) or multi-core processor(s)). Merely by way of example, the redundancy reducing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

Figure 2:
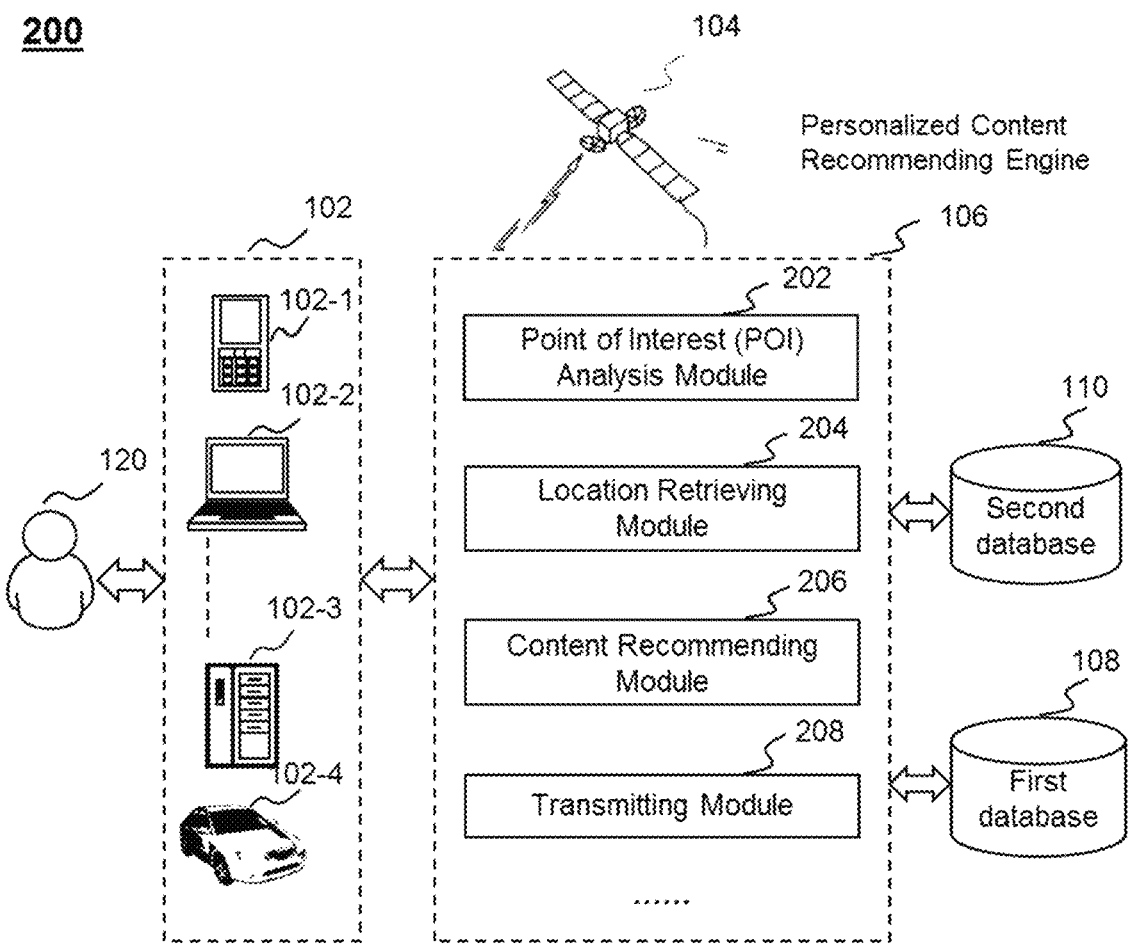
FIG. 2 is a block diagram illustrating an exemplary personalized content recommending engine according to some embodiments of the present disclosure.

FIG. 2 is a block diagram illustrating an exemplary personalized content recommending engine 106 according to some embodiments of the present disclosure. The PCR engine 106 may include a point of interest (POI) analysis module 202, a location retrieving module 204, a content recommending module 206, and a transmitting module 208.

The point of interest (POI) analysis module 202 may obtain and analyze data including a plurality of points of interests from one or more historical order(s) stored in the first database 108. In one example, the analyzed plurality of points of interests may be stored in the first database 108 as separate data entries. As in another example, the analyzed plurality of points of interests may be stored in a POI database separate from the first database 108. A POI may include information associated with a building or a road. For example, a POI may refer to a shopping mall, a park, a school, a hospital, a hotel, a restaurant, a supermarket, a tourist attraction, a landmark, or the like, or any combination thereof. The POI may further include information such as, a POI name, a POI position, a POI classification, or the like, or any combination thereof. A POI position may include longitudinal and latitudinal information of the POI. Merely by way of example, in New York City, a POI name may be Times Square, a POI position may be represented by the longitudinal and latitudinal coordinates of Times Square, and a POI classification may be entertainment landmark.

The POI database or the first database 108 may store the data of points of interests in various formats. For example, ASCII text format (e.g., files with suffix such as .txt, .asc, .csv, or .plt), topografix GPX format (e.g., files with suffix .gpx), and/or Garmin mapsource format (files with suffix .gdb) may be used to store the data of POI. Data entries of POIs using different formats may need to be converted to a common format before they can be used.

Data entries associated with the POI in the first database 108 and the second database 110 are created at different times by different users and may have redundancies For example, a POI $P_1$ from a historical order may have a same name or description as another POI $P_2$ from other historical order(s), but have different position from another POI $P_2$. In another example, a POI $P_1$ from a historical order may have the same position as another POI $P_2$ but have a different name or description from another POI $P_2$.

In some embodiments, the POIs analysis module 202 may update a first set of POIs based on a comparison between the first set of POIs with a standardized second set of POIs. For example, the POIs analysis module 202 may identify one or more POIs in the first set of POIs having different names/descriptions but directed to a same position. The POI analysis module 202 may unify the names/descriptions of the one or more POIs that direct to the same position. The first set of POIs may come from a POI database, e.g., the first database 108. The second set of standardized POIs may come from a different POI database, e.g., the second database 110.

In some embodiments, the POI information processed by the PCR engine 106 may be within a geographic area, for example, a block, a city, a district, a country, or the like, or any combination thereof. The POI information may be obtained by manual collection, package uploading, street view collection, satellite data collection, or the like, or any combination thereof. In some embodiments, the PCR engine 106 may update the POI information based on terminal (e.g., the user equipment 102, etc.) feedback information.

The location retrieving module 204 may retrieve a location of a user via a user equipment that the user is carrying. In some embodiments, the location of the user may be represented by the longitudinal and latitudinal coordinates. In some embodiments, the location of the user may be an address or a tag. For example, a block, a street, an avenue, a boulevard, a district, a city, a country, or the like, or any combination thereof.

The content recommending module 206 may search for content to be recommended to a user. The content recommending module 206 may determine the content to be recommended based on the location of the user and the historical orders associated with the user. In some embodiments, the user may interact with the one or more content items recommended by the content recommending module 206 via an interface. As another example, the user may pre-set the content recommending module 206 to recommend specific types of content via an interface of an internet mobile application, such as WeChat, MapQuest, etc.

The transmitting module 208 may transmit the content searched by the content recommending module 206 to the user. The transmission may be achieved in a wireless or wired way. The content to be transmitted may be an audio file, a video file, a webpage, a link to a webpage, an executable file, an app, a mini program, a text file, or the like, or any combination thereof.

The modules in the PCR engine 106 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the transmitting module 208 may be integrated in the content recommending module 206 as a single module which may both determine the content to be recommended and transmit the recommended content to the user(s).

Figure 3:
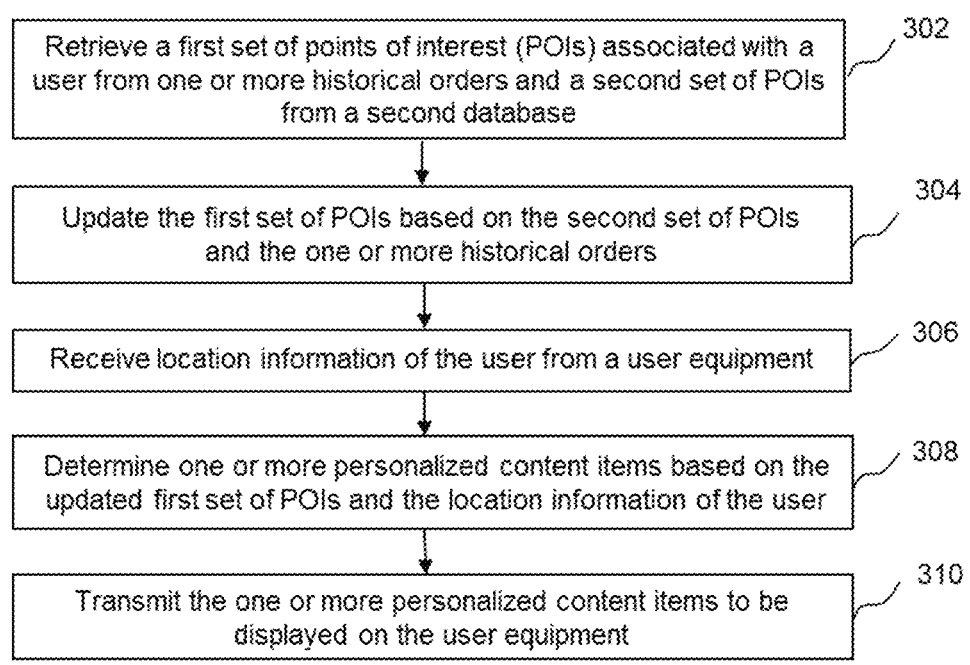
FIG. 3 is a flowchart of an exemplary method and/or process for recommending personalized content items to a user/user equipment according to some embodiments of the present disclosure.

FIG. 3 is a flowchart of an exemplary method and/or process for recommending personalized content items to a user/user equipment according to some embodiments of the present disclosure. The process and/or method may be operated by a computer server (e.g., the PCR engine 106) of an online transportation service platform of the location based service-providing system 100. For example, the method and/or process may be implemented as a set of instructions and stored in at least one storage medium of the online transportation service platform. At least one processor of a computer server of the platform may communicate with the storage medium and execute the set of instructions to perform the following steps.

In some embodiments, one or more users may book and/or obtain online transportation services via an online transportation service platform, such as the location based service-providing system 100, while one or more drivers may provide transportation services via the online transportation service platform. The user(s) may access the online transportation service platform through a user equipment (e.g., a user equipment 102-1). The user equipment may be a mobile terminal or a personal computer (PC). The user equipment may include smartphone, personal digital assistant (PDA), tablet computer, laptop, carputer (board computer), play station portable (PSP), smart glasses, smart watch, wearable devices, virtual display device, or display enhanced equipment (e.g. Google Glass, Oculus Rift, Hololens, Gear VR), or the like, or any combination thereof.

In step 301, a location based service-providing system may retrieve a first set of points of interests (POI) associated with one or more historical orders from a first database and a second set of POIs from a second database. The historical orders may be associated with one or more user equipments and/or users. The historical orders may refer to one or more orders of goods and/or services placed by the users and/or via one or more user equipments before the location based service-providing system sends recommended content to the user equipments and/or users. In some embodiments, the historical orders may be chosen from a pre-determined time interval. For example, the historical orders may be chosen within a period of one week, one month, two months, one year, or the like, or any combination thereof. In some embodiments, the historical orders may be labelled and the first set of POIs associated with the historical orders may be classified accordingly. The location based service-providing system may retrieve the first set of POIs associated with the historical orders according to the classification of the first set of POIs and/or the labelling of historical orders. For example, the historical orders may be labelled according to the gender of the user(s). The first set of POIs associated with the historical orders with gender of females may be classified into classes of "baby-care available" and "baby-care unavailable". The location based service-providing system may retrieve the first set of POIs of class "baby-care available" if the gender of the user(s) is female.

The first set of POIs may be stored into one or more first databases for further processing. In some embodiments, the first database may be a portable database. POIs stored in the first database may be in various formats whereas not stringent regarding the contemporariness and/or the size of the POI data. For example, the first database may not be updated in real time. The POIs associated with the historical orders may have inconsistency with respect to the name, the format, the position, the classification, and the like, and any combination thereof.

The second set of POIs retrieved from the second database by the location based service-providing system, on the other hand, may be consistent regarding the name, the format, the position, the classification, and the like, and any combination thereof. For example, there may be no two POIs in the second database with similar but distinct names, whereas the distance between the two POIs is less than a pre-determined threshold. To achieve the consistency of POIs, the second database may be updated in real-time. Further, the second database may be a global database containing data of POIs from places all over the world such as a block, a community, a district, a city, a county, a province, a country, a continent, and the like, and any combination thereof. In some embodiments, the second database may operate as a back-end database of a server device connected to the internet.

The second set of POIs retrieved from the second database may be related to the first set of POIs. In some embodiments, those POIs in the second database bearing the same POI names with one of the first set of POIs may be chosen as the second set of POIs. In some embodiments, those POIs in the second database bearing the same POI positions with one of the first set of POIs may be chosen as the second set of POIs.

In step 304, the first set of POIs in the first database may be updated based on the second set of POIs and the one or more historical orders. During the process of updating, redundancy reduction may be concurrently performed on the first set of POIs. Some of the redundant POIs in the first database may be deleted or modified. Exemplary processes of updating the first set of POIs in the first database may be found in the description of FIG. 5 and FIG. 6 that follow.

In step 306, the location based service-providing system may receive location information of the user from a user equipment. The location based service-providing system may then determine one or more personalized content items based on the updated first set of POIs and the location information of the user in step 308. In some embodiments, the location based service-providing system may use the classification of the updated first set of POIs to determine the personalized content items. For example, the location based service-providing system may analyze the hobby, the preference, the motivation, the need, or the like, of the user using information on classification of the updated first set of POIs. The personalized content items identified by the location based service-providing system may then include the POIs near the location of the user that match the hobby, preference, motivation, need, or the like, of the user. In some embodiments, the personalized content times identified by the location based service-providing system may include the POIs along an estimated route of the user that match the hobby, preference, motivation, need, or the like, of the user. In some further embodiments, the personalized content items may include commercial advertisements associated with the POIs near the location of the user. In step 310, the location based service-providing system may transmit the one or more personalized content items to be displayed on the user equipment. The personalized content items may be an audio file, a video file, a webpage, a link to a webpage, an executable file, an application, a mini program, a text file, or the like, or any combination thereof. The personalized content items may be formatted to be applicable to the display properties of the user equipment.

Figure 4:
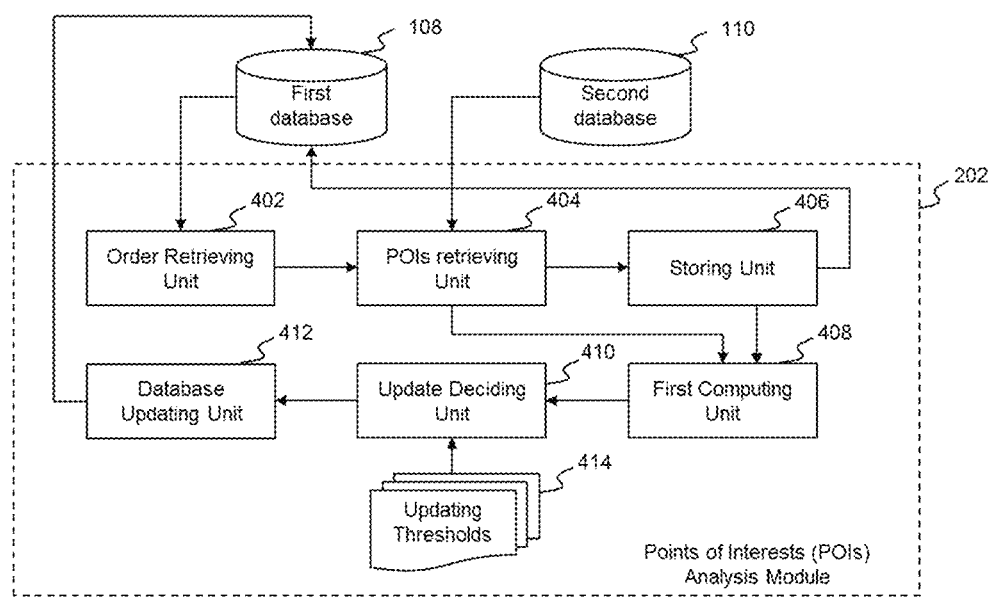
FIG. 4 is a block diagram illustrating an exemplary points of interests (POIs) analysis module according to some embodiments of the present disclosure.

FIG. 4 is a block diagram illustrating an exemplary point of interest (POI) analysis module 202 according to some embodiments of the present disclosure. The point of interest analysis module 202 may include an order retrieving unit 402, a POI retrieving unit 404, a storing unit 406, a first computing unit 408, an update deciding unit 410, a database updating unit 412.

The order retrieving unit 402 may retrieve one or more historical orders from the first database 110. The historical orders may be associated with a user. In some embodiments, the historical orders associated with the user may be retrieved according to a time interval. For example, the historical orders may be located in a time interval of an hour, a day, a week, a month, a year, or the like, or any combination thereof. The historical orders retrieved by the order retrieving unit 402 may be sent to the POI retrieving unit 404.

The POI retrieving unit 404 may retrieve a first set of POIs from the historical orders. For example, for each retrieved historical order $O_1$ sent to the POI retrieving unit 404, the POI retrieving unit 404 may identify the POIs that appeared along a route determined during the historical order $O_1$. The first set of POIs together with the historical orders may be sent to the storing unit 406, and stored into the first database 110 subsequently.

For the first set of POIs associated with the historical orders, the POI retrieving unit 404 may retrieve a corresponding second set of POIs from the second database 108. Each POI in the second set of POIs may have the same POI name with a POI in the first set of POIs. The second set of POIs, together with the first set of POIs and the historical orders, may be sent to the first computing unit 408, by the POI retrieving unit 404, respectively.

The first computing unit 408 may calculate one or more parameters based on the first set of POIs, second set of POIs, and the historical orders. For example, the first computing unit 408 may calculate the number of occurrence M for each of the first set of POIs. For another example, the first computing unit 408 may calculate a geographical distance D between each of the first set of POIs occurring in the first database and a corresponding POI occurring in the second database. The parameters calculated by the first computing unit 408 may be sent to the update deciding unit 410. The update deciding unit 410 may decide as to whether to update the first set of POIs in the first database based on the one or more parameters calculated by the first computing unit 408 and one or more updating thresholds 414. The result of the update decision given by the update deciding unit 410 may be sent to database updating unit 412. The database updating unit 412 may update the first set of POIs in the database 108 accordingly.

Figure 5:
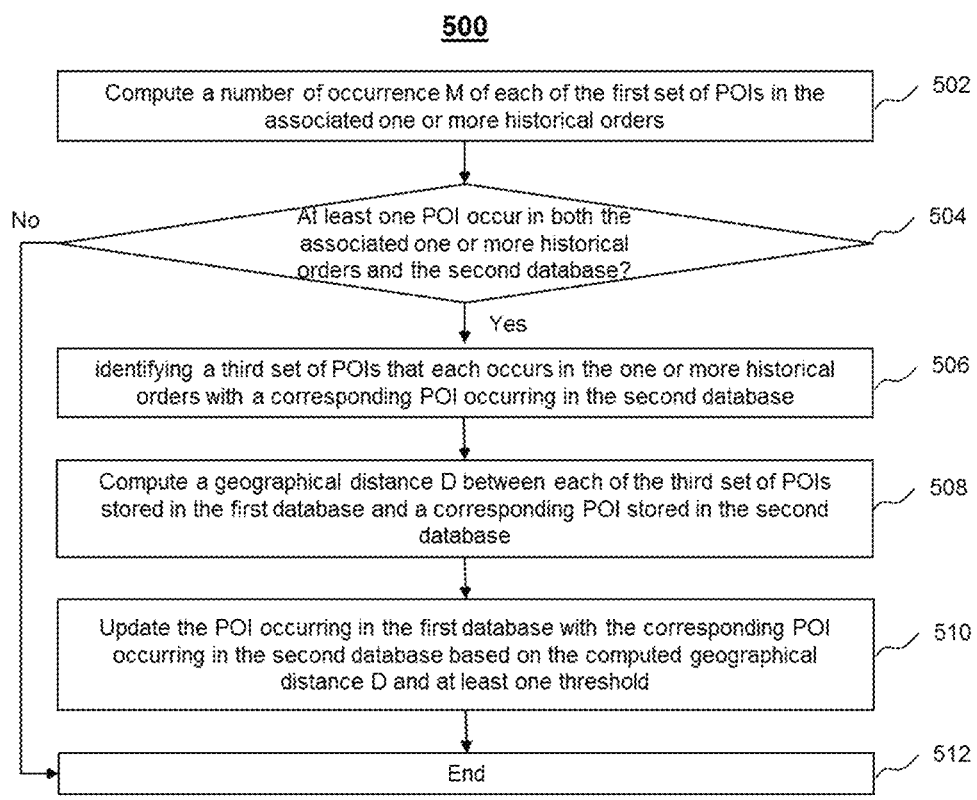
FIG. 5 is a flowchart of an exemplary method and/or process for updating the POI in a first database based on real-time POI information stored in a second database according to some embodiments of the present disclosure.

FIG. 5 is a flowchart of an exemplary method and/or process for updating the POI in a first database based on real-time POI information stored in a second database according to some embodiments of the present disclosure. The process and/or method may be operated by a computer server (e.g., the PCR engine 106) of an online transportation service platform of the location based service-providing system 100. In some embodiments, the illustrated process and/or method may be operated by the point of interest (POI) analysis module 202 of the PCR engine 106. For example, the method and/or process may be implemented as a set of instructions and stored in at least one storage medium of the online transportation service platform. At least one processor of a computer server of the platform may communicate with the storage medium and execute the set of instructions to perform the following steps.

In step 502, a number of occurrences M for each of the first set of POIs in the associated one or more historical orders may be computed. The number M may be used for estimating the frequency of appearance for each of the first set of POIs. The number M may be stored in the first database, or the memory of the PCR engine 106 (not shown), etc. The first set of POIs in the associated one or more historical orders may be stored in the first database.

In step 504, a determination may be made as to whether at least one POI occurs in both the one or more historical orders and the second database. If it is determined that no POI both occurs in the associated one or more historical orders and the second database, the process terminates at step 512. If it is determined that at least one POI occurs in both the one or more historical orders and the second database, the process may go to the next step 506 for further processing.

In step 506, a third set of POIs that each occurs in the one or more historical orders with a corresponding POI occurring in the second database is identified. For example, a POI with the same POI name may appear in both the associated one or more historical orders and the second database. In some embodiments, the third set of POIs associated with one or more historical orders may contain inconsistency, and thus need to be revised or updated.

In step 508, for each of the third set of POIs stored in the first database $P_1$, a geographical distance D between $P_1$ and a corresponding POI $P_2$ stored in the second database may be computed. The correspondence between POIs $P_1$ and $P_2$ may refer to that $P_1$ and $P_2$ have the same POI name. It should be noted that multiple POIs from the third set of POIs stored in the first database may have the same or similar POI name, whereas with distinct POI positions that are not far away from each other. Nevertheless, the multiple POIs from the third set of POIs stored in the first database may have the same corresponding POI stored in the second database.

The geographical distance D may be calculated using the longitudinal and latitudinal coordinates of $P_1$ and $P_2$. For example, the geographical distance D may be maximum value of the differences of the longitudinal coordinates and latitudinal coordinates between $P_1$ and $P_2$.

In step 510, the POI occurring in the first database with the corresponding POI occurring in the second database may be updated based on the computed geographical distance D, the number of occurrence M, and at least one updating threshold. As illustrated below, a detailed updating process may be described in FIG. 6.

Figure 6:
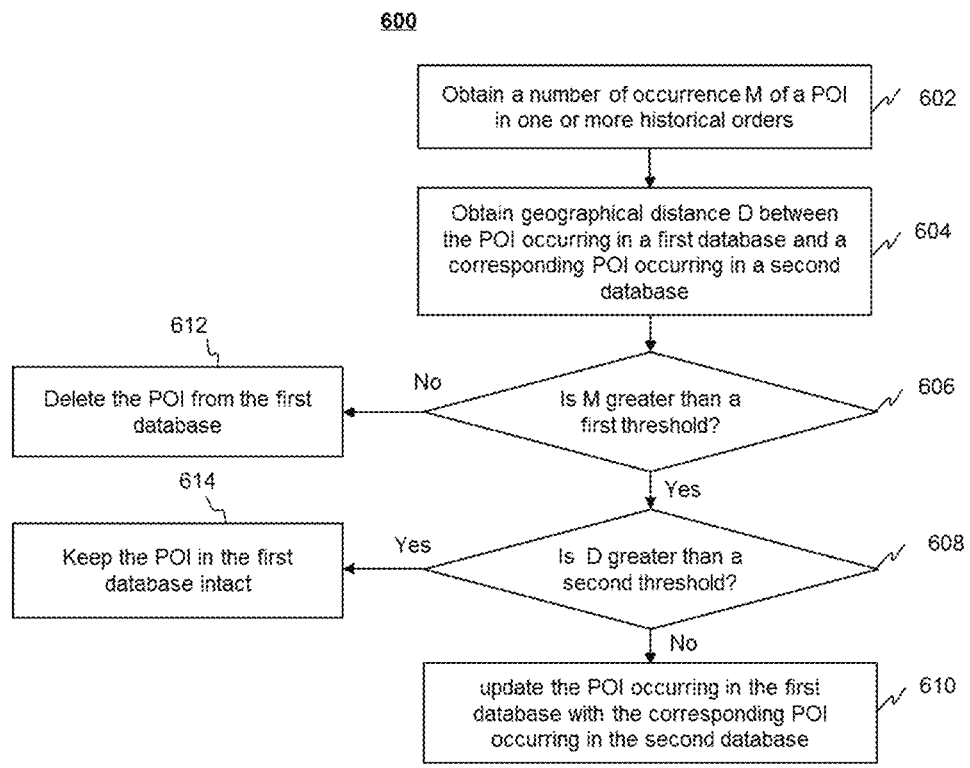
FIG. 6 is a flowchart of an exemplary method and/or process for updating the POI in the first database based on real-time POI information stored in the second database according to some other embodiments of the present disclosure.

FIG. 6 is a flowchart of an exemplary method and/or process for updating the POI in the first database based on real-time POI information stored in the second database according to some other embodiments of the present disclosure. The process and/or method may be operated by a computer server (e.g., the PCR engine 106) of an online transportation service platform of the location based service-providing system 100. In some embodiments, the illustrated process and/or method may be operated by the point of interest (POI) analysis module 202 of the PCR engine 106. For example, the method and/or process may be implemented as a set of instructions and stored in at least one storage medium of the online transportation service platform. At least one processor of a computer server of the platform may communicate with the storage medium and execute the set of instructions to perform the following steps.

In step 602, a number of occurrence M of a POI in one or more historical orders may be obtained.

In step 604, a geographical distance D between the POI occurring in a first database and a corresponding POI occurring in a second database may be obtained.

In step 606, a determination may be made as to whether the number of occurrence M is greater than a first threshold. The first threshold may refer to an integer. In some embodiments, the first threshold may be an integer no more than 5.

In some other embodiments, the first threshold may be an integer no more than 2. If the number of occurrence M is equal to or less than a first threshold, it is determined that the occurrences of the POI in the first database is sparse and thus, the POI is deleted from the first database in step 612. If the number of occurrence M is greater than a first threshold, the process may go to the next step 608.

In step 608, a determination may be made as to whether the geographical distance D is greater than a second threshold. The second threshold may refer to a distance. For example, the second threshold may be 1000 meters. In some embodiments, the second threshold may be a distance no more than 500 meters. If the geographical distance D is greater than a second threshold, it is determined that the POI occurring in the first database may be different from the corresponding POI occurring in the second database, and thus the POI occurring in the first database may be kept intact in step 614. If the geographical distance D is equal to or less than a second threshold, it is determined that the POI occurring in the first database is the same as the corresponding POI occurring in the second database, and the process may go to the next step 610.

In step 610, the POI occurring in the first database may be updated with the corresponding POI occurring in the second database. The updating of the POI $P_1$ occurring in the first database by the corresponding POI $P_2$ occurring in the second database may refer to that the POI name, longitudinal coordinate, latitudinal coordinate, classification, and/or the POI format of P1, is replaced by the corresponding POI name, longitudinal coordinate, latitudinal coordinate, classification, and/or the POI format of P2. Because the POI data in the second database is updated and maintained in the real-time, the POI data in the first database after updating may be more consistently and accurately named.

Figure 7:
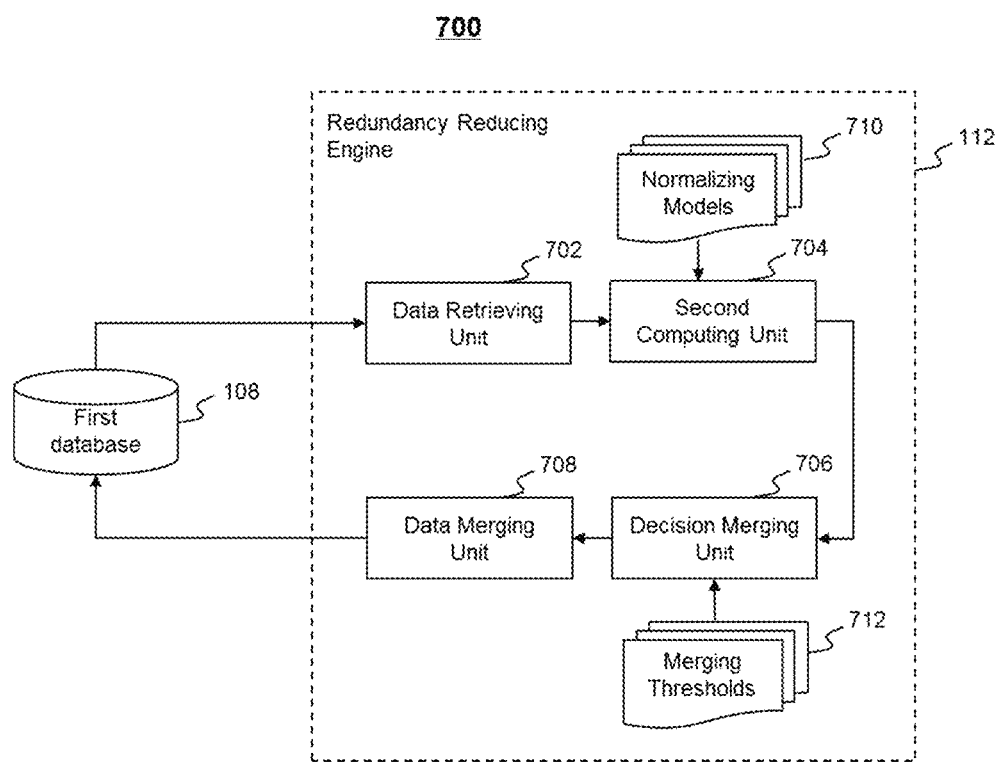
FIG. 7 is a block diagram illustrating an exemplary redundancy reducing engine according to some embodiments of the present disclosure.

FIG. 7 is a block diagram illustrating an exemplary redundancy reducing engine 112 according to some embodiments of the present disclosure. The redundancy reducing engine 112 may include a data retrieving unit 702, a second computing unit 704, a decision merging unit 706, and a data merging unit 708.

The data retrieving unit 702 may retrieve data of POIs from the first database 108. In some embodiments, at least two POIs may be retrieved from the first database 108. The second computing unit 704 may receive the data of POIs retrieved by the data retrieving unit 702 and perform a plurality of calculations based on the retrieved data of POIs. In some embodiments, the second computing unit 704 may calculate distance(s) between two POIs $P_{11}$ and $P_{12}$. The distance between $P_{11}$ and $P_{12}$ may be a geographical distance, an edit distance (or a Levenshtein distance), or the like, or any combination thereof. The calculated distance(s) may contain at least two different types of distance between $P_{11}$ and $P_{12}$.

In some embodiments, the distance between $P_{11}$ and $P_{12}$ may be normalized. The way of normalizing the distance between $P_{11}$ and $P_{12}$ may be based on the normalizing models 710. The normalizing models 710 may define a plurality of normalizing constant, normalizing expression, normalizing frequency, or the like, or any combination thereof.

The decision merging unit 706 may receive the retrieved data of $P_{11}$ and $P_{12}$, the at least two different types of distance between the data of $P_{11}$ and $P_{12}$, together with a plurality of thresholds from the merging thresholds 712, to make a decision regarding whether the data of $P_{11}$ and $P_{12}$ should be merged or not. If it is determined that $P_{11}$ and $P_{12}$ direct to an identical geographical entity, the data merging unit 708 may then merge $P_{11}$ and $P_{12}$ into a single POI. The merged POIs may be sent to the first database 108 by the data merging unit 708.

It would be appreciated by the people of ordinary skill in the art that two or more of the units may be combined as a single unit, and any one of the units may be divided into two or more sub-units. For example, the second computing unit 704 may be integrated in the decision merging unit 706 as a single unit which may both compute the distance(s) between the data of POIs and determine if the data of POIs are of the identical geographical entity. The redundancy reducing engine 112 as illustrated in FIG. 7B is applied to the first database 108. However, the present disclosure is not intended to be limiting. The redundancy reducing engine 112 may also be applied to the second database 110 and any types of databases.

Figure 8:
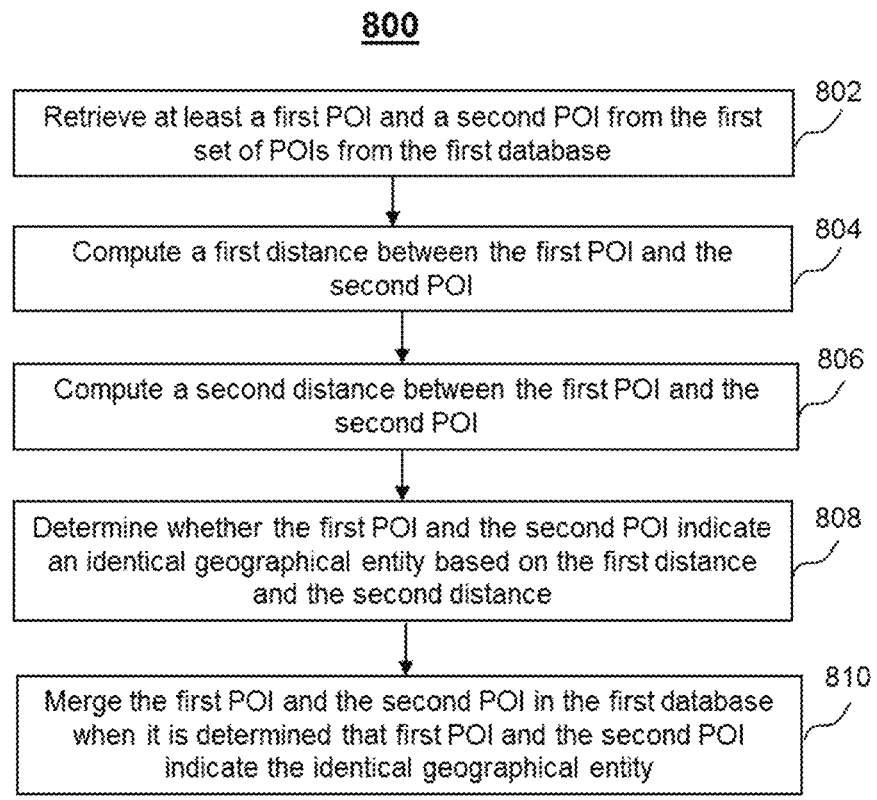
FIG. 8 is a flowchart of an exemplary method and/or process for reducing redundancy of POIs in the first database according to some embodiments of the present disclosure.

FIG. 8 is a flowchart of an exemplary method and/or process for reducing redundancy of POIs in the first database according to some embodiments of the present disclosure. The process and/or method may be operated by a computer server (e.g., the PCR engine 106) of an online transportation service platform of the location based service-providing system 100. In some embodiments, the illustrated process and/or method may be operated by the redundancy reducing engine 112 of the PCR engine 106. For example, the method and/or process may be implemented as a set of instructions and stored in at least one storage medium of the online transportation service platform. At least one processor of a computer server of the platform may communicate with the storage medium and execute the set of instructions to perform the following steps.

In step 802, a first POI $P_{11}$ and a second POI $P_{12}$ from the set of POIs. The first POI $P_{11}$ and the second POI $P_{12}$ may share partial common POI information. For example, the first POI $P_{11}$ may have the same or similar POI name as the second POI $P_{12}$. For another example, the first POI $P_{11}$ may have the same or nearby POI position as the second POI $P_{12}$. The first POI $P_{11}$ and the second POI $P_{12}$ may come from different historical orders.

In step 804, a first distance between the first POI $P_{11}$ and the second POI $P_{12}$ may be computed. In some embodiments, the first distance may be a geographical distance between the first POI $P_{11}$ and the second POI $P_{12}$. For example, the first distance may be the maximum value of the differences of the longitudinal coordinates and latitudinal coordinates between $P_{11}$ and $P_{12}$.

In step 806, a second distance between the first POI $P_{11}$ and the second $P_{12}$ may be computed. In some embodiments, the second distance may be an edit distance (or a Levenshtein distance) between the first POI $P_{11}$ and the second POI $P_{12}$. The edit distance between two POIs $P_{11}$ and $P_{12}$ may refer to the least number of editing operations to convert the name of $P_{11}$ to the name of $P_{12}$. The editing operation may include replacing one character of the POI name by another, inserting a character into the POI name, and/or deleting a character from the POI name. It would be understood by the people of ordinary skill in the art that the smaller the edit distance between $P_{11}$ and $P_{12}$, the more similar the names of $P_{11}$ and $P_{12}$. In some embodiments, the second distance, for example the edit distance, may be normalized to facilitate further processing. The normalized edit distance between $P_{11}$ and $P_{12}$ may be given by multiplying the edit distance between $P_{11}$ and $P_{12}$ with a scale factor, whereas the scale factor may be based on the length of POI name of $P_{11}$ and $P_{12}$. The range of the normalized edit distance may be from zero to one. For example, a normalized edit distance may be given as follows:

NormEditDis($P_{11}$, $P_{12}$)=EditDis($P_{11}$, $P_{12}$)/Max(Len($P_{11}$), Len($P_{12}$)), where NormEditDis($P_{11}$, Put) is the normalized edit distance between $P_{11}$ and $P_{12}$, EditDis($P_{11}$, $P_{12}$) is the edit distance between $P_{11}$ and $P_{12}$. Len($P_{11}$) and Len($P_{12}$) are the lengths of POI name of $P_{11}$ and $P_{12}$, respectively. Max(Len($P_{11}$), Len($P_{12}$)) means the maximum value of two lengths of POI name of $P_{11}$ and $P_{12}$.

In step 808, it is determined as to whether the first POI $P_{11}$ and the second POI $P_{12}$ indicate an identical geographical entity based on the first distance and the second distance. In some embodiments, some strategy or criteria may be applied to determine the similarity between $P_{11}$ and $P_{12}$. For example, a third threshold for first distance and a fourth threshold for second distance may be designated. The third threshold and/or the fourth threshold may be pre-set or trained using the historical data. The first POI $P_{11}$ and the second POI $P_{12}$ is determined to indicate an identical geographical entity, if the first distance between $P_{11}$ and $P_{12}$ is less than the third threshold, and the normalized second distance between $P_{11}$ and $P_{12}$ is less than the fourth threshold.

In step 810, the first POI $P_{11}$ and the second POI $P_{12}$ in the first database may be merged when it is determined that $P_{11}$ and $P_{12}$ indicate the identical geographical entity. In some embodiments, one or more criteria may be applied regarding the merging process. For example, the merging process may be based on the one or more criteria that the POI with the higher frequency of occurrence will replace the POI with the lower frequency of occurrence. As another example, the one or more criteria may include a first criterion in which the POIs to be merged are in close proximity to each other and a second criterion in which the POIs to be merged semantically direct to an identical geographical entity. The proximity of the POIs may be determined based on streets, business entities, counties, zip codes, or the combination thereof.

In some embodiments, a unified naming and/or classification system of POIs in the first database may be utilized. The POIs in the first database may be merged according to the unified naming and/or classification system. For example, a POI with name "Crown Plaza Hotel" and another POI with name "Crown Hotel" that are determined to be merged together may be merged into one single POI with a unified name "30, South College road, Crown Hotel."

Figure 9A:
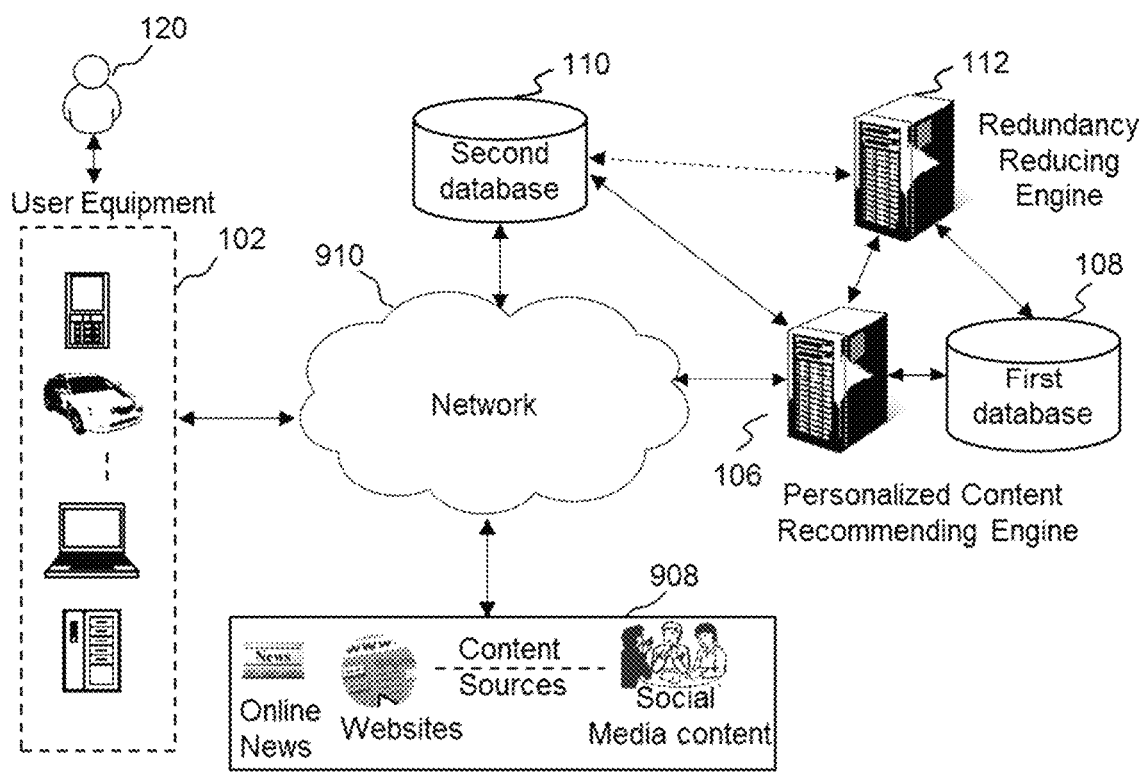
FIG. 9A is an exemplary network environment of providing a location based service to end users according to some embodiments of the present disclosure.

FIG. 9A is an exemplary network environment of providing a location based service to end users according to some embodiments of the present disclosure. As shown in FIG. 9A, the user 120 may communicate with the personalized content recommending (PCR) engine 106 via the network 910, using the user equipment 102. The PCR engine 106 may determine one or more historical orders associated with the user 120 within a pre-determined time interval. The one or more historical orders may be retrieved from the first database 108 or the second database 110. The PCR engine 106 may retrieve a first set of POIs associated with the historical orders. The first set of POIs may then be stored into the first database 110. The first set of POIs may be stored in the first database as file(s), table(s), list(s), or the like, or any combination thereof.

To improve the consistency within the first set of POIs, the PCR engine 106 may retrieve a corresponding second set of POIs from the second database 110. The PCR engine 106 may then update the first set of POIs based on a comparison of the first set of POIs and the second set of POIs. The process of updating the first set of POIs using the first set of POIs and the second set of POIs may be implemented using the exemplary processes as described in FIGS. 5 and 6. In addition, the PCR engine 106 may periodically call upon the redundancy reducing engine 112 to reduce the redundancy within the first set of POIs. According to the illustrated embodiment, the redundancy reducing engine 112 may act as a back-end computer server to the personalized content recommending engine 106. The process of reducing the redundancy in the first set of POIs may be implemented using the exemplary process as described in FIG. 8. Further, a polling algorithm may be implemented by the redundancy reducing engine 112 to traverse the POIs in the first database 108. For example, a sequential polling algorithm, a tree traversing algorithm, a graph traversing algorithm, or the like, or any combination thereof, may be implemented by the redundancy reducing engine 112.

In some embodiments, the PCR engine 106 may receive a request from the user 120 via the user equipment 102. The PCR engine 106 may locate the position of the user 120 via the user equipment 102. Based on the updated first set of POIs, and/or the position of the user 120, the PCR engine 106 may then search the content sources 908, via possibly the network 910, to determine the contents to recommend to the user 120. The content sources 908 may include online news, websites, social media content, or the like, or any combination thereof.

Figure 9B:
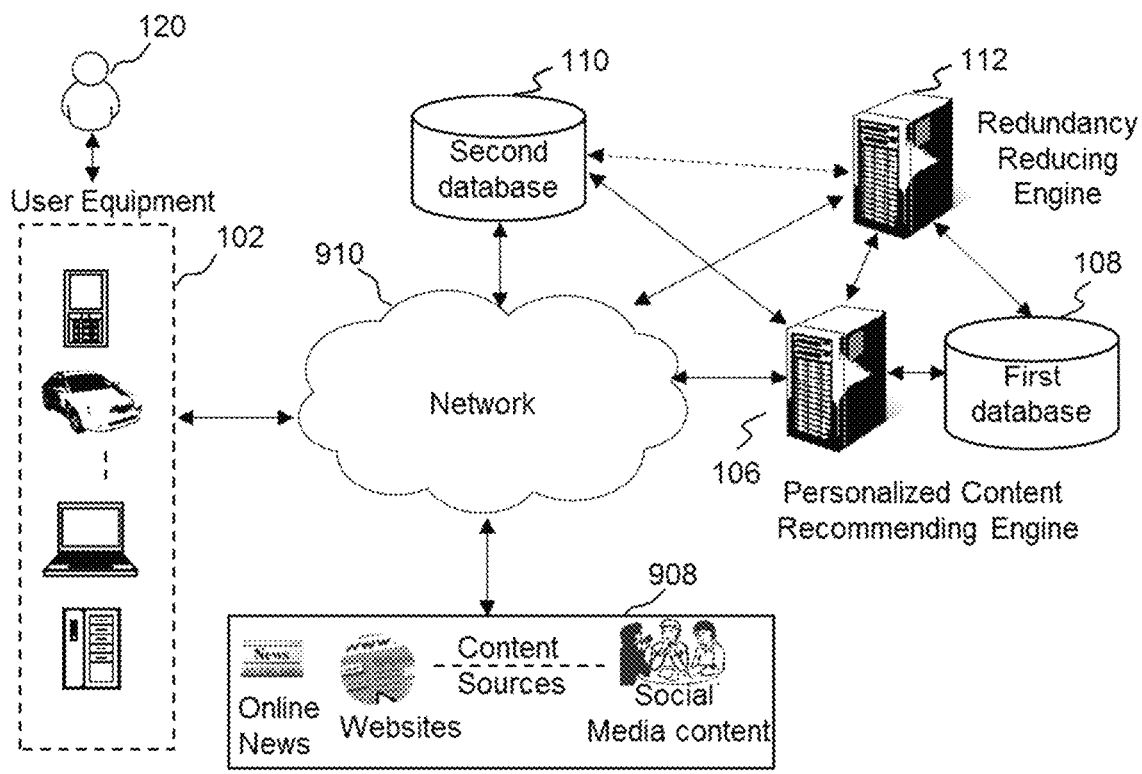
FIG. 9B is an exemplary network environment of providing a location based service to end users according to some other embodiments of the present disclosure.

FIG. 9B is an exemplary network environment of providing a location based service to end users according to some other embodiments of the present disclosure. The networked environment according to the illustrated embodiment is similar to the networked environment illustrated in FIG. 9A, except that the redundancy reducing engine 112 may act as an independent computer server. The redundancy reducing engine 112 may connect to the network 910 directly and provide database redundancy reducing service to parties other than the location based service-providing system 100.

Figure 10:
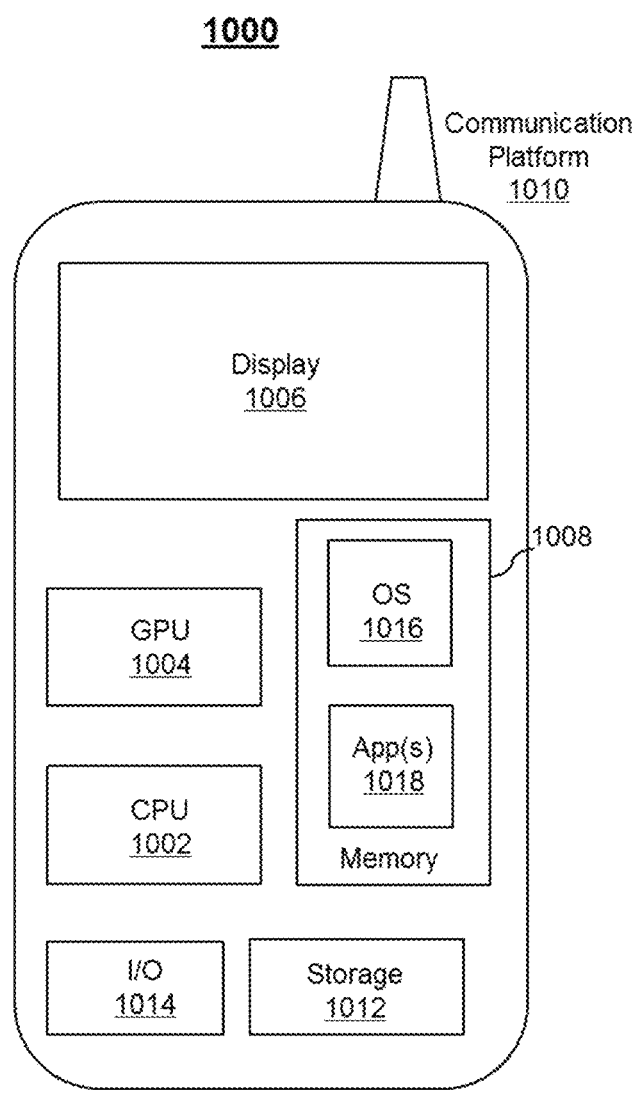
FIG. 10 depicts the architecture of a mobile device on which the present disclosure can be implemented.

FIG. 10 depicts the architecture of a mobile device on which the present disclosure can be implemented. In this example, the user device on which information relating to an order for service or other information from the scheduling system is presented and interacted—with is a mobile device 1000, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1000 in this example includes one or more central processing units (CPUs) 1002, one or more graphic processing units (GPUs) 1004, a display 1006, a memory 1008, a communication platform 1010, such as a wireless communication module, storage 1012, and one or more input/output (I/O) devices 1014. Any other suitable component, including but not limited to a system bus or a controller (not shown), may also be included in the mobile device 1000. As shown in FIG. 10, a mobile operating system 1770, e.g., iOS, Android, Windows Phone, etc., and one or more applications 1016 may be loaded into the memory 1008 from the storage 1012 in order to be executed by the CPU 1002. The applications 1018 may include a browser or any other suitable mobile apps for receiving and rendering information relating to an order for service or other information from the location based service providing system on the mobile device 1000. User interactions with the information stream may be achieved via the I/O devices 1014 and provided to the location based service-providing system 100 and/or other components of system 100, e.g., via the network.

To implement various modules, units, and their functionalities described in the present disclosure, computer hardware platforms may be used as the hardware platform(s) for one or more of the elements described herein (e.g., the location based service-providing system 100, and/or other components of the location based service-providing system 100 described with respect to FIGS. 1-9). The hardware elements, operating systems and programming languages of such computers are conventional in nature, and it is presumed that those skilled in the art are adequately familiar therewith to adapt those technologies to the management of the supply of service as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 11:
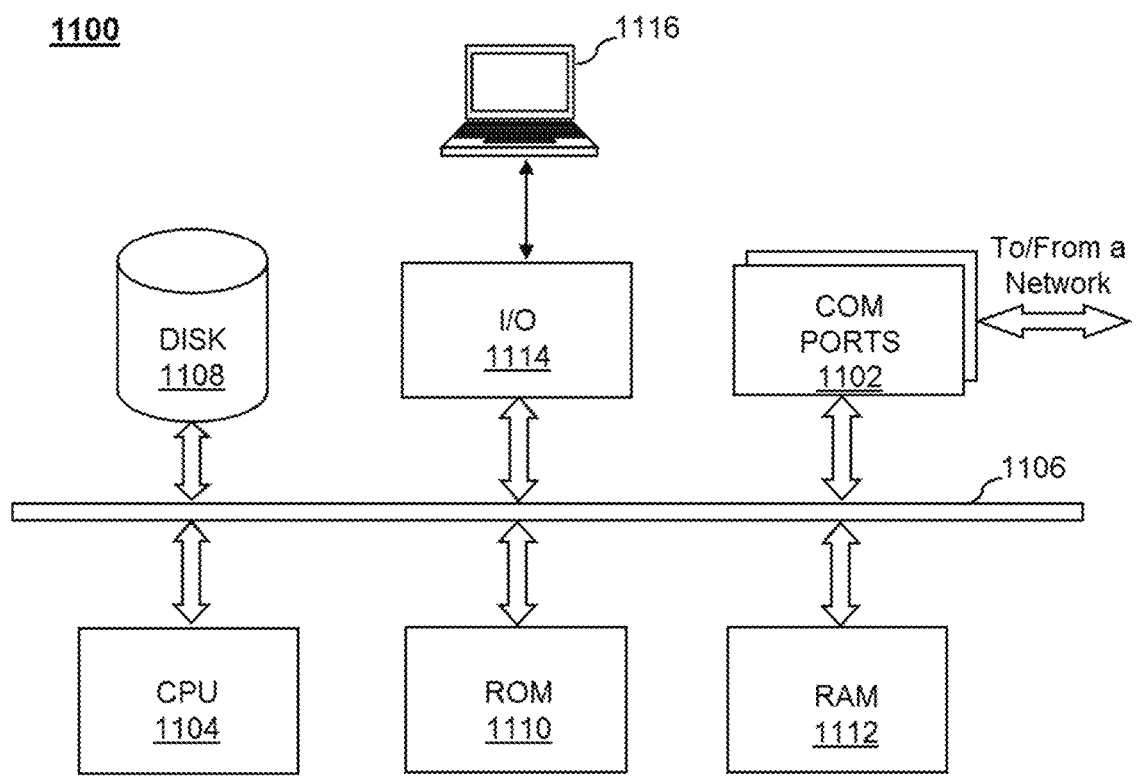
FIG. 11 is a schematic diagram illustrating exemplary hardware and software components of a computing device on which the personalized content recommending engine, the user equipment, and/or the provider terminal may be implemented according to some embodiments of the present disclosure.

FIG. 11 is a schematic diagram illustrating exemplary hardware and software components of a computing device 1100 on which the PCR engine 106, the user equipment 102, and/or the provider terminal 140 may be implemented according to some embodiments of the present disclosure. For example, the PCR engine 106 may be implemented on the computing device 1100 and configured to perform functions of the PCR engine 106 disclosed in this disclosure.

The computing device 1100 may be a general purpose computer or a special purpose computer, both may be used to implement an on-demand system for the present disclosure. The computing device 1100 may be used to implement any component of the on-demand service as described herein. For example, the PCR engine 106 may be implemented on the computing device 1100, via its hardware, software program, firmware, or a combination thereof. Although only one such computer is shown, for convenience, the computer functions relating to the on-demand service as described herein may be implemented in a distributed fashion on a number of similar platforms, to distribute the processing load.

The computing device 1100, for example, may include COM ports 250 connected to and from a network connected thereto to facilitate data communications. The computing device 1100 may also include a central processing unit (CPU) 220, in the form of one or more processors, for executing program instructions. The exemplary computer platform may include an internal communication bus 210, program storage and data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, RAM 240, and/or other type of non-transitory storage medium to be executed by the CPU 220. The methods and/or processes of the present disclosure may be implemented as the program instructions. The computing device 1100 may also include an I/O component 260, supporting input/output between the computer and other components therein such as user interface elements 280. The computing device 1100 may also receive programming and data via network communications.

Merely for illustration, only one CPU and/or processor is described in the computing device 1100. However, it should be noted that the computing device 1100 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 1100 executes both step A and step B, it should be understood that step A and step B may also be performed by two different CPUs and/or processors jointly or separately in the computing device 1100 (e.g., the first processor executes step A and the second processor executes step B, or the first and second processors jointly execute steps A and B).

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device" or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 11003, Perl, COBOL 11002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

What is claimed is:

1. A method implemented on a computing device for recommending personalized content to a user, comprising:
   acquiring, by logic circuits, first electronic signals including one or more historical orders associated with a user within a predetermined time interval;
   retrieving, by the logic circuits, a first set of points of interests (POI) associated with the user based on the one or more historical orders;
   sending, by the logic circuits, second electronic signals including the first set of POIs associated with the user to be saved in a first storage device;
   transmitting, by the logic circuits, third electronic signals to access a second storage device to read a second set of POIs;
   updating, by the logic circuits, the first set of POIs in the first storage device based on the second set of POIs and the one or more historical orders, wherein the updating the first set of POIs in the first storage include:
      determining at least one POI from the first set of POIs,
      determining the at least one POI from the second set of POIs, and updating information of the at least one POI in the first storage with information of the at least one POI in the second storage if it is determined that a first geographical location of the at least one POI from the first set of POIs and a second geographical location of the at least one POI from the second set of POIs satisfy a preset condition for judging whether two POIs are the same POI, wherein the preset condition includes a first distance between the first POI and the second POI being less than or equal to a third threshold and a normalized second distance between the first POI and the second POI being less than or equal to a fourth threshold, the normalized second distance being a value between 0 and 1;

transmitting, by the logic circuits, fourth electronic signals to access a third storage device of a user equipment to read location information of the user;

determining, by the logic circuits, one or more personalized content items based on the updated first set of POIs and the location information of the user; and transmitting, by the logic circuits, fifth electronic signals including the one or more personalized content items to the user equipment, causing the one or more personalized content items to be displayed on the user equipment.

2. The method of claim 1, wherein the one or more historical orders are associated with a location based service provided to the user.

3. The method of claim 1, wherein the second storage device stores real-time data associated with a location based service provided to a plurality of users.

4. The method of claim 1, wherein updating the first set of POIs in the first storage device based on the second set of POIs and the one or more historical orders comprises:
computing a number of occurrence of each of the first set of POIs in the one or more historical orders;
identifying a third set of POIs that each occurs in the one or more historical orders with a corresponding POI occurring in the second storage device; and
computing a geographical distance between each of the third set of POIs occurring in the first storage device and the corresponding POI occurring in the second storage device.

5. The method of claim 4, wherein updating the first set of POIs in the first storage device based on the second set of POIs and the one or more historical orders further comprises:
when the geographic distance between one of the third set of POIs occurring in the first storage device and a corresponding POI occurring in the second storage device is less than a first threshold and the number of occurrence of the one of the third set of POIs occurring in the one or more historical orders is greater than a second threshold, transmitting a sixth signal to the first storage device to update the one of the third set of POIs occurring in the first storage device with the corresponding POI occurring in the second storage device.

6. The method of claim 5, wherein updating the first set of POIs in the first storage device based on the second set of POIs and the one or more historical orders further comprises:
when the geographic distance between one of the third set of POIs occurring in the first storage device and a corresponding POI occurring in the second storage device is less than the first threshold and the number of occurrence of the one of the third set of POIs occurring in the one or more historical orders is less than the second threshold, transmitting a seventh signal to the first storage device to delete the one of the third set of POIs from the first storage device.

7. The method of claim 6, wherein updating the first set of POIs in the first storage device based on the second set of POIs and the one or more historical orders further comprises:
if it is determined that none of POIs occurs in both the one or more historical orders and the second storage device, when the number of occurrence of one of the first set of POIs in the one or more historical orders is less than the second threshold, transmitting an eighth signal to the first storage device to delete the one of the first set of POIs from the first storage device.

8. The method of claim 1, further comprising:
performing redundancy reduction on the first set of POIs.

9. The method of claim 8, wherein performing redundancy reduction on the first set of POIs comprises:
retrieving a first POI and a second POI from the first set of POIs;
computing the first distance between the first POI and the second POI;
computing the second distance between the first POI and the second POI;
determining whether the first POI and the second POI indicate an identical geographical entity based on the first distance and the second distance; and
when it is determined that first POI and the second POI indicate an identical geographical entity, transmitting a ninth signal to the first storage device to merge the first POI and the second POI in the first storage device.

10. The method of claim 9, wherein determining whether the first POI and the second POI indicate an identical geographical entity based on the first distance and the second distance further comprises:
when the preset condition is satisfied, determining that the first POI and the second POI indicate an identical geographical entity.

11. A system for recommending personalized content to a user, comprising:
a bus;
a storage medium electronically connected to the bus, including a set of instructions; and
logic circuits in communication with the storage medium via the bus, wherein when executing the set of instructions, the logic circuits are configured to cause the system to:
acquire first electronic signals including one or more historical orders associated with a user within a predetermined time interval;
retrieve a first set of points of interests (POI) associated with the user based on the one or more historical orders;
send second electronic signals including the first set of POIs associated with the user to be saved in a first storage device;
transmit third electronic signals to access a second storage device to read a second set of POIs;
update the first set of POIs in the first storage device based on the second set of POIs and the one or more historical orders, wherein the logic circuits are further configured to cause the system to:
determine at least one POI from the first set of POIs,
determine the at least one POI from the second set of POIs, and
update information of the at least one POI in the first storage with information of the at least one POI in the second storage if it is determined that a first geographical location of the at least one POI from the first set of POIs and a second geographical location of the at least one POI from the second set of POIs satisfy a preset condition for judging whether two POIs are the same POI, wherein the preset condition includes a first distance between the first POI and the second POI being less than or equal to a third threshold and a normalized second distance between the first POI and the second POI being less than or equal to a fourth threshold, the normalized second distance being a value between 0 and 1;

transmit fourth electronic signals to access a third storage device of a user equipment to read location information of the user;

determine one or more personalized content items based on the updated first set of POIs and the location information of the user; and transmit fifth electronic signals including the one or more personalized content items to the user equipment, causing the one or more personalized content items to be displayed on the user equipment.

12. The system of claim 11, wherein the one or more historical orders are associated with a location based service provided to the user.

13. The system of claim 11, wherein the second storage device stores real-time data associated with a location based service provided to a plurality of users.

14. The system of claim 11, wherein to update the first set of POIs in the first storage device based on the second set of POIs and the one or more historical orders, the logic circuits are further configured to cause the system to:

compute a number of occurrence of each of the first set of POIs in the one or more historical orders;

identify a third set of POIs that each occurs in the one or more historical orders with a corresponding POI occurring in the second storage device; and compute a geographical distance between each of the third set of POIs occurring in the first storage device and the corresponding POI occurring in the second storage device.

15. The system of claim 14, wherein to update the first set of POIs in the first storage device based on the second set of POIs and the one or more historical orders, the logic circuits are further configured to cause the system to:

transmit a sixth signal to the first storage to update one of the third set of POIs occurring in the first storage device with a corresponding POI occurring in the second storage device when the geographic distance between the one of the third set of POIs occurring in the first storage device and the corresponding POI occurring in the second storage device is less than a first threshold and the number of occurrence of the one of the third set of POIs occurring in the one or more historical orders is greater than a second threshold.

16. The system of claim 15, wherein to update the first set of POIs in the first storage device based on the second set of POIs and the one or more historical orders, the logic circuits are further configured to cause the system to:

transmit a seventh signal to the first storage to delete one of the third set of POIs from the first storage device when the geographic distance between the one of the third set of POIs occurring in the first storage device and a corresponding POI occurring in the second storage device is less than the first threshold and the number of occurrence of the one of the third set of POIs occurring in the one or more historical orders is less than the second threshold.

17. The system of claim 16, wherein to update the first set of POIs in the first storage device based on the second set of POIs and the one or more historical orders, the logic circuits are further configured to cause the system to:

transmit an eighth signal to the first storage to delete one of the first set of POIs from the first storage device if it is determined that no POI occurs in both the one or more historical orders and the second storage device, and when the number of occurrence of the one of the first set of POIs in the one or more historical orders is less than the second threshold.

18. The system of claim 11, the logic circuits are further configured to cause the system to:

perform redundancy reduction on the first set of POIs.

19. The system of claim 18, wherein to perform redundancy reduction on the first set of POIs, the logic circuits are further configured to cause the system to:

retrieve a first POI and a second POI from the first set of POIs;

compute the first distance between the first POI and the second POI;

compute the second distance between the first POI and the second POI;

determine whether the first POI and the second POI indicate an identical geographical entity based on the first distance and the second distance; and transmit a ninth signal to the first storage device to merge the first POI and the second POI in the first storage device when it is determined that first POI and the second POI indicate the identical geographical entity.

20. A non-transitory computer readable medium embodying a computer program product, the computer program product comprising instructions configured to cause a computing device to:

acquiring, by logic circuits, first electronic signals including one or more historical orders associated with a user within a predetermined time interval;

retrieving, by the logic circuits, a first set of points of interests (POI) associated with the user based on the one or more historical orders;

sending, by the logic circuits, second electronic signals including the first set of POIs associated with the user to be saved in a first storage device;

transmitting, by the logic circuits, third electronic signals to access a second storage device to read a second set of POIs;

updating, by the logic circuits, the first set of POIs in the first storage device based on the second set of POIs and the one or more historical orders, wherein the updating the first set of POIs include:

determining at least one POI from the first set of POIs, determining the at least one POI from the second set of POIs, and updating information of the at least one POI in the first storage with information of the at least one POI in the second storage if it is determined that a first geographical location of the at least one POI from the first set of POIs and a second geographical location of the at least one POI from the second set of POIs satisfy a preset condition for judging whether two POIs are the same POI, wherein the preset condition includes a first distance between the first POI and the second POI being less than or equal to a third threshold and a normalized second distance between the first POI and the second POI being less than or equal to a fourth threshold, the normalized second distance being a value between 0 and 1;

transmitting, by the logic circuits, fourth electronic signals to access a third storage device of a user equipment to read location information of the user;
determining, by the logic circuits, one or more personalized content items based on the updated first set of POIs and the location information of the user; and
transmitting, by the logic circuits, fifth electronic signals including the one or more personalized content items to the user equipment, causing the one or more personalized content items to be displayed on the user equipment.

* * * * *